United States Patent
Wall et al.

(10) Patent No.: US 10,134,025 B2
(45) Date of Patent: *Nov. 20, 2018

(54) ONE-CLICK OFFLINE BUYING

(71) Applicant: GOOGLE LLC, Mountain View, CA (US)

(72) Inventors: Jonathan Wall, San Francisco, CA (US); Rob von Behren, Berkeley, CA (US); Raymond Emmett Colline, II, San Bruno, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,728

(22) Filed: Jul. 8, 2016

(65) Prior Publication Data

US 2016/0321648 A1   Nov. 3, 2016

Related U.S. Application Data

(63) Continuation of application No. 13/361,343, filed on Jan. 30, 2012, now Pat. No. 9,390,414.

(60) Provisional application No. 61/536,042, filed on Sep. 18, 2011.

(51) Int. Cl.
*G06Q 40/00* (2012.01)
*G06Q 20/32* (2012.01)
*G06Q 20/36* (2012.01)

(52) U.S. Cl.
CPC ..... *G06Q 20/3278* (2013.01); *G06Q 20/3227* (2013.01); *G06Q 20/367* (2013.01)

(58) Field of Classification Search
CPC ........ G06Q 10/00; G06Q 20/00; G06Q 30/00; G06Q 40/00
USPC ....................................................... 705/3-44
See application file for complete search history.

(56) References Cited

U.S. PATENT DOCUMENTS

| | | |
|---|---|---|
| 6,005,942 A | 12/1999 | Chan et al. |
| 6,141,752 A | 10/2000 | Dancs et al. |
| 6,484,174 B1 | 11/2002 | Wall et al. |
| 6,647,260 B2 | 11/2003 | Dusse et al. |

(Continued)

FOREIGN PATENT DOCUMENTS

| | | |
|---|---|---|
| CN | 1319966 A | 10/2001 |
| CN | 1835007 A | 9/2006 |

(Continued)

OTHER PUBLICATIONS

Zhou, "Chinese Office Action issued in Chinese Application No. 2012800482817", dated Mar. 27, 2017, 11 pages of English Translation and 12 pages of Chinese Office Action.

(Continued)

*Primary Examiner* — Frantzy Poinvil
(74) *Attorney, Agent, or Firm* — Johnson, Marcou & Isaacs, LLC

(57) ABSTRACT

Contactless payment transactions are initiated through single input activation of a mobile device's secure element and contactless communication system. Activation of the secure element and the contactless communication system is coupled to the activation status of the mobile device's screen. Activation of the secure element may be further coupled to the activation status of an electronic wallet application. Where activation of the electronic wallet application is required, one-click activation of the electronic wallet application and secure element is provided.

23 Claims, 4 Drawing Sheets

(56) References Cited

U.S. PATENT DOCUMENTS

| | | |
|---|---|---|
| 7,072,854 B2 | 7/2006 | Loeser |
| 7,110,792 B2 | 9/2006 | Rosenberg |
| 7,128,274 B2 | 10/2006 | Kelley et al. |
| 7,140,549 B2 | 11/2006 | de Jong |
| 7,152,782 B2 | 12/2006 | Shenker et al. |
| 7,232,073 B1 | 6/2007 | de Jong |
| 7,243,853 B1 | 7/2007 | Levy et al. |
| 7,255,264 B2 | 8/2007 | De Leon |
| 7,275,685 B2 | 10/2007 | Gray et al. |
| 7,374,099 B2 | 5/2008 | de Jong |
| 7,469,151 B2 | 12/2008 | Khan et al. |
| 7,494,055 B2 | 2/2009 | Fernandes et al. |
| 7,631,346 B2 | 12/2009 | Hinton et al. |
| 7,631,810 B2 | 12/2009 | Liu et al. |
| 7,729,722 B2 | 6/2010 | Rofougaran et al. |
| 7,748,618 B2 | 7/2010 | Vawter |
| 7,764,932 B2 | 7/2010 | Rofougaran et al. |
| 7,784,684 B2 | 8/2010 | Labrou et al. |
| 7,844,242 B2 | 11/2010 | Rofougaran et al. |
| 7,896,233 B2 | 3/2011 | Phillips |
| 7,949,309 B2 | 5/2011 | Rofougaran et al. |
| 7,996,320 B2 | 8/2011 | Bishop et al. |
| 8,005,426 B2 | 8/2011 | Huomo et al. |
| 8,016,192 B2 | 9/2011 | Messerges et al. |
| 8,041,338 B2 | 10/2011 | Chen et al. |
| 8,121,945 B2 | 2/2012 | Rackley, III et al. |
| 8,126,806 B1 | 2/2012 | DiMartino et al. |
| 8,131,596 B2 | 3/2012 | McQuilken |
| 8,240,560 B2 | 8/2012 | Adams et al. |
| 8,358,596 B2 | 1/2013 | Byrne et al. |
| 8,369,889 B2 | 2/2013 | Rofougaran et al. |
| 8,379,551 B2 | 2/2013 | Wietfeldt et al. |
| 8,380,177 B2 | 2/2013 | Laracey |
| 8,467,766 B2 | 6/2013 | Rackley, III et al. |
| 8,577,810 B1 | 11/2013 | Dalit et al. |
| 8,774,721 B2 | 7/2014 | Hertel et al. |
| 9,008,616 B2 | 4/2015 | Wall et al. |
| 9,198,214 B2 | 11/2015 | Hertel et al. |
| 9,390,414 B2 | 7/2016 | Wall et al. |
| 2001/0018666 A1 | 8/2001 | Sugiyama et al. |
| 2002/0068554 A1 | 6/2002 | Dusse |
| 2002/0194138 A1 | 12/2002 | Dominguez et al. |
| 2004/0181453 A1 | 9/2004 | Ray et al. |
| 2005/0071418 A1 | 3/2005 | Kjellberg et al. |
| 2005/0222961 A1 | 10/2005 | Staib et al. |
| 2005/0238149 A1 | 10/2005 | De Leon |
| 2006/0018450 A1 | 1/2006 | Sandberg-Diment |
| 2006/0035632 A1 | 2/2006 | Sorvari et al. |
| 2006/0165060 A1 | 7/2006 | Dua |
| 2007/0022058 A1 | 1/2007 | Labrou et al. |
| 2007/0099679 A1 | 5/2007 | Saarisalo |
| 2007/0135164 A1 | 6/2007 | Lee |
| 2007/0156436 A1 | 7/2007 | Fisher et al. |
| 2007/0235539 A1 | 10/2007 | Sevanto et al. |
| 2007/0278290 A1 | 12/2007 | Messerges et al. |
| 2008/0011837 A1 | 1/2008 | Wesley |
| 2008/0051059 A1 | 2/2008 | Fisher |
| 2008/0085698 A1 | 4/2008 | Gamm |
| 2008/0230615 A1 | 9/2008 | Read et al. |
| 2008/0242237 A1 | 10/2008 | Rofougaran et al. |
| 2008/0242240 A1 | 10/2008 | Rofougaran et al. |
| 2008/0242346 A1 | 10/2008 | Rofougaran et al. |
| 2008/0287060 A1 | 11/2008 | Ramsten et al. |
| 2008/0306849 A1 | 12/2008 | Johnson, Jr. et al. |
| 2009/0006263 A1 | 1/2009 | Power et al. |
| 2009/0068982 A1 | 3/2009 | Chen et al. |
| 2009/0094125 A1 | 4/2009 | Killian et al. |
| 2009/0144161 A1 | 6/2009 | Fisher |
| 2009/0170483 A1 | 7/2009 | Barnett et al. |
| 2009/0192935 A1 | 7/2009 | Griffin et al. |
| 2009/0240626 A1 | 9/2009 | Hasson et al. |
| 2009/0254479 A1 | 10/2009 | Pharris |
| 2010/0023449 A1 | 1/2010 | Skowronek et al. |
| 2010/0049654 A1 | 2/2010 | Pilo |
| 2010/0086012 A1 | 4/2010 | Rofougaran et al. |
| 2010/0088188 A1 | 4/2010 | Kumar et al. |
| 2010/0121725 A1 | 5/2010 | Adams et al. |
| 2010/0130240 A1 | 5/2010 | Hart |
| 2010/0161403 A1 | 6/2010 | Fisher et al. |
| 2010/0167646 A1 | 7/2010 | Alameh et al. |
| 2010/0174598 A1 | 7/2010 | Khan et al. |
| 2010/0211504 A1 | 8/2010 | Aabye et al. |
| 2010/0232474 A1 | 9/2010 | Rofougaran et al. |
| 2010/0257033 A1 | 10/2010 | Roberts et al. |
| 2010/0268618 A1 | 10/2010 | McQuilken |
| 2010/0312629 A1 | 12/2010 | Wolf et al. |
| 2011/0034133 A1 | 2/2011 | Rofougaran et al. |
| 2011/0050164 A1 | 3/2011 | Partovi et al. |
| 2011/0076941 A1 | 3/2011 | Taveau et al. |
| 2011/0093326 A1 | 4/2011 | Bous et al. |
| 2011/0112968 A1 | 5/2011 | Florek et al. |
| 2011/0149764 A1 | 6/2011 | Wietfeldt et al. |
| 2011/0171907 A1 | 7/2011 | Jolivet |
| 2011/0173073 A1 | 7/2011 | Wang et al. |
| 2011/0177780 A1 | 7/2011 | Sato et al. |
| 2011/0187652 A1 | 8/2011 | Huibers |
| 2011/0191438 A1 | 8/2011 | Huibers et al. |
| 2011/0191823 A1 | 8/2011 | Huibers |
| 2011/0202415 A1 | 8/2011 | Casares et al. |
| 2011/0275421 A1 | 11/2011 | Wong et al. |
| 2011/0292973 A1 | 12/2011 | Kianush et al. |
| 2011/0320293 A1 | 12/2011 | Khan |
| 2012/0015605 A1 | 1/2012 | Sole |
| 2012/0023026 A1 | 1/2012 | Chen et al. |
| 2012/0029997 A1 | 2/2012 | Khan et al. |
| 2012/0078751 A1 | 3/2012 | MacPhail et al. |
| 2012/0108173 A1 | 5/2012 | Hahm et al. |
| 2012/0143703 A1 | 6/2012 | Wall et al. |
| 2012/0190386 A1 | 7/2012 | Anderson |
| 2012/0214411 A1 | 8/2012 | Levy |
| 2012/0276938 A1 | 11/2012 | Wagholikar et al. |
| 2012/0310743 A1 | 12/2012 | Johri |
| 2012/0329407 A1 | 12/2012 | Rousu et al. |
| 2013/0040571 A1 | 2/2013 | Wall et al. |
| 2013/0060959 A1 | 3/2013 | Taveau et al. |
| 2013/0080238 A1 | 3/2013 | Kelly et al. |
| 2013/0090064 A1 | 4/2013 | Herron et al. |
| 2013/0093388 A1 | 4/2013 | Partovi |
| 2013/0109433 A1 | 5/2013 | Wang et al. |
| 2013/0246203 A1 | 9/2013 | Laracey |
| 2013/0297425 A1 | 11/2013 | Wallaja |
| 2014/0310182 A1 | 10/2014 | Cummins |
| 2015/0186871 A1 | 7/2015 | Laracey |
| 2016/0132918 A1 | 5/2016 | Thomas |

FOREIGN PATENT DOCUMENTS

| | | |
|---|---|---|
| CN | 101116322 A | 1/2008 |
| CN | 101201947 A | 6/2008 |
| CN | 101263694 A | 9/2008 |
| CN | 101536008 A | 9/2009 |
| CN | 101546401 A | 9/2009 |
| CN | 101567108 A | 10/2009 |
| CN | 101836216 A | 9/2010 |
| CN | 101866463 A | 10/2010 |
| CN | 101933246 A | 12/2010 |
| CN | 102160068 A | 8/2011 |
| CN | 102160070 A | 8/2011 |
| EP | 1 122 674 A2 | 8/2001 |
| EP | 1 229 467 A1 | 8/2002 |
| EP | 1 517 277 A2 | 3/2005 |
| EP | 2 034 428 A1 | 3/2009 |
| JP | 2001-216451 A | 8/2001 |
| JP | 2005-346611 A | 12/2005 |
| JP | 2006-253762 A | 9/2006 |
| JP | 2008-510406 A | 4/2008 |
| JP | 2008-306385 A | 12/2008 |
| JP | 2009-152875 A | 7/2009 |
| JP | 2010-191640 A | 9/2010 |
| JP | 2010-225069 A | 10/2010 |
| JP | 2010-537320 A | 12/2010 |
| JP | 2010-541036 A | 12/2010 |
| KR | 10-2006-0114029 A | 11/2006 |
| KR | 10-2008-0017357 A | 2/2008 |

(56) References Cited

FOREIGN PATENT DOCUMENTS

| | | |
|---|---|---|
| KR | 10-2008-0023712 A | 3/2008 |
| KR | 10-2009-0026812 A | 3/2009 |
| KR | 10-2009-0077606 A | 7/2009 |
| KR | 10-2009-0112076 A | 10/2009 |
| KR | 10-0923117 B1 | 10/2009 |
| KR | 10-2009-0121497 A | 11/2009 |
| KR | 10-2010-0034688 A | 4/2010 |
| KR | 10-2011-0090899 A | 8/2011 |
| KR | 10-2014-0063816 A | 5/2014 |
| KR | 10-1757421 B1 | 7/2017 |
| WO | 01/020509 A1 | 3/2001 |
| WO | 01/22374 A1 | 3/2001 |
| WO | 01/52212 A1 | 7/2001 |
| WO | 2004/054125 A1 | 6/2004 |
| WO | 2006/027646 A1 | 3/2006 |
| WO | 2006/111782 A1 | 10/2006 |
| WO | 2008/034937 A1 | 3/2008 |
| WO | 2009/018255 A2 | 2/2009 |
| WO | 2009/026337 A1 | 2/2009 |
| WO | 2009/036264 A1 | 3/2009 |
| WO | 2009/105115 A2 | 8/2009 |
| WO | 2010/032216 A1 | 3/2010 |
| WO | 2010/114499 A2 | 10/2010 |
| WO | 2010/144370 A2 | 12/2010 |
| WO | 2011/035515 A1 | 3/2011 |
| WO | 2011/100001 A1 | 8/2011 |
| WO | 2011/127627 A1 | 10/2011 |
| WO | 2012/075410 A1 | 6/2012 |
| WO | 2013/028646 A2 | 2/2013 |
| WO | 2012/075410 A8 | 3/2013 |
| WO | 2013/040605 A2 | 3/2013 |
| WO | 2013/028646 A3 | 5/2013 |
| WO | 2013/040605 A3 | 5/2013 |
| WO | 2013/155122 A1 | 10/2013 |

OTHER PUBLICATIONS

Park, "Korean Office Action issued in Korean Application No. 10-2014-7007212", dated Oct. 31, 2017, 7 pages of English Translation and 7 pages of Korean Office Action.
Yook, "Korean Office Action issued in Korean Application No. 10-2015-7035030", dated Sep. 27, 2017, 4 pages of English Translation and 4 pages of Korean Office Action.
Zhou, "Chinese Office Action issued in Chinese Application No. 201280048281.7", dated Oct. 9, 2016, 11 pages of English Translation and 09 pages of Chinese Office Action.
"Chinese Office Action issued in Chinese Application No. 201280048309.7", dated Jun. 13, 2017, 3 pages of English Translation and 4 pages of Chinese Office Action.
Lopez Perez, "European Office Action issued in European Application No. 13775567.4", dated Sep. 22, 2017, 5 pages.
Abadie, "International Search Report and Written Opinion issued in International Application No. PCT/US2011/063091", dated Mar. 6, 2012, 13 pages.
Becamel, "International Preliminary Report on Patentability issued in International Application No. PCT/US2011/063091", dated Jun. 13, 2013, 9 pages.
Bolton, "Australian Office Action issued in Australian Application No. 2011336348", dated May 31, 2013, 3 pages.
Bolton, "Australian Office Action issued in Australian Application No. 2011336348", dated Dec. 19, 2013, 4 pages.
Boly, et al., "The ESPIRIT Project CAFE—High Security Digital Payment Systems", ESCORICS 94 (Third European Symposium on Research in Computer Security), LNCS 875, 1994, 14 pages.
Byrd, "U.S. Office Action issued in copending U.S. Appl. No. 13/410,209, filed Mar. 1, 2012", dated Jun. 19, 2015, 25 pages.
Byrd, "U.S. Office Action issued in copending U.S. Appl. No. 13/410,209, filed Mar. 1, 2012", dated Jan. 4, 2016, 29 pages.
Byrd, "U.S. Office Action issued in copending U.S. Appl. No. 13/410,209, filed Mar. 1, 2012", dated Jul. 11, 2016, 33 pages.
Byrd, "U.S. Office Action issued in copending U.S. Appl. No. 13/410,209, filed Mar. 1, 2012", dated Dec. 5, 2014, 21 pages.
Chen, "How to Write a Java Card Applet: A Developer's Guide", JavaWorld.com, Jul. 1, 1999, 9 pages.
Chencinski, "U.S. Office Action issued in copending U.S. Appl. No. 13/361,343, filed Jan. 30, 2012", dated Jun. 7, 2013, 12 pages.
Chencinski, "U.S. Office Action issued in copending U.S. Appl. No. 13/361,343, filed Jan. 30, 2012", dated Dec. 3, 2013, 14 pages.
Corum, "Santa Clara Puts Payments in 'Palm' of Your Hand: Palms and Cellphones Initiate Payments to Campus Card System", CR80News.com, vol. 2, No. 5, May 2003, 5 pages.
Daswani, et al., "SWAPEROO: A Simple Wallet Architecture for Payments, Exchanges, Refunds, and Other Operations", Proceedings of the 3rd USENIX Workshop on Electronic Commerce, Aug. 31-Sep. 3, 1998, 20 pages.
Dotzer, "Aspects of Multi-Application Smart Card Management Systems", Thesis at the Lehrstuhl fur Dateoverarbeitung (LDV) (Institute of Data Processing), Munchen Technical University, Oct. 15, 2002, 124 pages.
ECMA International, "Near Field Communication Interface and Protocol—(NFCI P-2)", Standard ECMA-352, 2nd Edition, Jun. 2010, 12 pages.
ETSI, "Smart Card: UICC-CLF Interface: Host Controller Interface P2P LNC Protocol (Document inputted in NFC Forum for information)", Draft ETSI TS 1, V0.1.0, Jan. 11, 2008, 33 pages.
Gillmore, "Australian Office Action issued in Australian Application No. 2012308186", dated Sep. 17, 2013, 3 pages.
Global Platform Inc., "Global Platform: Contactless Services, Card Specification v2.2", Amendment C, Version 1.0, Feb. 2010, 77 pages.
Guerra, "Canada Office Action received for Canada Patent Application No. 2849018", dated Jul. 28, 2016, 5 pages.
Guerra, "Canada Office Action received for Canada Patent Application No. 2869917", dated Dec. 18, 2014, 3 pages.
Hancke, et al., "Confidence in smart token proximity: Relay attacks revisited", ISG Smart Card Centre, Royal Holloway, University of London, Egham TW20 OEX, UK, Oct. 2009, 13 pages.
Hardeman, "European Office Action issued in European Application No. 12831568.6", dated Mar. 15, 2016, 7 pages.
Hardeman, "Extended European Search Report issued in European Application No. 12825391.1", dated Jan. 8, 2015, 7 pages.
Hardeman, "Extended European Search Report issued in European Application No. 12831568.6", dated Dec. 11, 2014, 6 pages.
Hernandez, et al., "E-Wallet Software Architecture with Decentralized Credentials", Norsk Informatikkonferancse (NIK), 2003, 12 pages.
Hernandez, "E-Wallet with Decentralized Credential Keepers", Master Thesis for Institutt for Telematikk, Jun. 30, 2003, 74 pages.
Hopping, et al., "Technology in Retail", IBM Corporation, Technology in Society, No. 22, 2000, 12 pages.
Hsieh, "U.S. Office Action issued in copending U.S. Appl. No. 13/443,683, filed Apr. 10, 2012", dated Jul. 5, 2013, 10 pages.
Hsieh, "U.S. Office Action issued in copending U.S. Appl. No. 13/443,683, filed Apr. 10, 2012", dated Aug. 21, 2012, 14 pages.
Hsieh, "U.S. Office Action issued in copending U.S. Appl. No. 13/443,683, filed Apr. 10, 2012", dated Jan. 2, 2013, 15 pages.
Hsieh, "U.S. Office Action issued in copending U.S. Appl. No. 14/324,416, filed Jul. 7, 2014", dated Oct. 27, 2014, 17 pages.
Hsieh, "U.S. Office Action issued in copending U.S. Appl. No. 14/324,416, filed Jul. 7, 2014", dated Mar. 3, 2015, 6 pages.
Huang, et al., "Future Personal 'E-Payment': IrFM", IEEE Wireless Communications, Feb. 2006, 7 pages.
International Standard ISO/IEC, "ISO/IEC 21481:2005 Information Technology—Telecommunications and Information Exchange between Systems—Near Field Communication Interface and Protocol—2 (NFCIP-2)", International Standard ISO/IEC, Vil. 21481, Jan. 1, 2005, 11 pages.
Kai, "Japanese Office Action issued in Japanese Application No. 2013-542212", dated Jul. 14, 2014, 6 pages of English Translation and 5 pages of Japanese Office Action.
Kang, "International Search Report and Written Opinion issued in International Application No. PCT/US2013/035861", dated Jun. 24, 2013, 12 pages.

(56) References Cited

OTHER PUBLICATIONS

Langer, et al., "NFC Technologie", In: Anwedungen und Technik von Near Field Communication (NFC), Jan. 1, 2010, 23 pages.
Lopez Perez, "Extended European Search Report issued in European Application No. 13775567.4", dated Nov. 18, 2015, 7 pages.
Mjolsnes, et al., "On-Line E-Wallet System with Decentralized Credential Keepers", Mobile Networks and Applications 8, 87-99, 2003, 13 pages.
Mohri, "International Preliminary Report on Patentability issued in International Application No. PCT/US2013/035861", dated Oct. 23, 2014, 9 pages.
Nakamura, "International Preliminary Report on Patentability issued in International Application No. PCT/US2012/055951", dated Mar. 27, 2014, 7 pages.
NFC, "Releasing Google Wallet, an Electronic Wallet Using Near Field Communication (NFC) with related English article", URL:// http://cusee.net/2462753, May 27, 2011, 8 pages.
NFC Forum, "Connection Handover Technical Specification NFC Forum", XP055118241, Connection Handover 1.2, Jul. 7, 2010, 23 pages.
Nickitas-Etienne, "International Preliminary Report on Patentability issued in International Application No. PCT/US2012/051641", dated Mar. 6, 2014, 7 pages.
NXP Semiconductors, "PN533 User Manual Rev. 03", XP55020096, Jan. 14, 2009, 173 pages.
Oh, "International Search Report and Written Opinion issued in International Application No. PCT/US2012/051641", dated Mar. 25, 2013, 9 pages.
Oh, "International Search Report and Written Opinion issued in International Application No. PCT/US2012/055951", dated Mar. 15, 2013, 10 pages.
Park, "Korean Office Action issued in Korean Application No. 10-2014-7009875", dated Sep. 10, 2015, 3 pages of English Translation and 3 pages of Korean Office Action.
Park, "Korean Office Action issued in Korean Application No. 10-2014-7009875", dated Mar. 9, 2015, 6 pages of English Translation and 5 pages of Korean Office Action.
Zhou, "Chinese Office Action issued in Chinese Application No. 201280048309.7", dated Jun. 17, 2016, 16 pages of English Translation and 10 pages of Chinese Office Action.
Park, "Korean Office Action issued in Korean Application No. 10-2014-7009875", dated Apr. 19, 2016, 6 pages of English Translation and 6 pages of Korean Office Action.
Park, "Korean Office Action issued in Korean Application No. 10-2014-7009875", dated Jul. 31, 2014, 7 pages of English Translation and 7 pages of Korean Office Action.
Rojas, "U.S. Office Action issued in copending U.S. Appl. No. 13/246,076, filed Sep. 27, 2011", dated Nov. 28, 2012, 10 pages.
Rojas, "U.S. Office Action issued in copending U.S. Appl. No. 13/246,076, filed Sep. 27, 2011", dated Feb. 15, 2012, 7 pages.
Rojas, "U.S. Office Action issued in copending U.S. Appl. No. 13/246,076, filed Sep. 27, 2011", dated Jul. 18, 2012, 9 pages.
Rojas, "U.S. Office Action issued in copending U.S. Appl. No. 13/655,321, filed Oct. 18, 2012", dated Dec. 11, 2013, 13 pages.
Shaawat, "U.S. Office Action issued in copending U.S. Appl. No. 13/315,818, filed Dec. 9, 2011", dated Jun. 4, 2014, 7 pages.
Shaawat, "U.S. Office Action issued in copending U.S. Appl. No. 13/315,818, filed Dec. 9, 2011", dated Mar. 12, 2013, 7 pages.
Shaawat, "U.S. Office Action issued in copending U.S. Appl. No. 13/315,818, filed Dec. 9, 2011", dated Aug. 7, 2012, 8 pages.
Shaawat, "U.S. Office Action issued in copending U.S. Appl. No. 13/315,818, filed Dec. 9, 2011", dated Aug. 20, 2014, 8 pages.
Shaawat, "U.S. Office Action issued in copending U.S. Appl. No. 13/315,818, filed Dec. 9, 2011", dated Jul. 30, 2013, 8 pages.
Shaawat, "U.S. Office Action issued in copending U.S. Appl. No. 13/315,818, filed Dec. 9, 2011", dated Mar. 23, 2012, 8 pages.
Shaawat, "U.S. Office Action issued in copending U.S. Appl. No. 13/315,818, filed Dec. 9, 2011", dated Jan. 17, 2014, 9 pages.
Shin, "Korean Office Action issued in Korean Application No. 10-2014-7031050", dated Dec. 22, 2014, 3 pages of English Translation and 3 pages of Korean Office Action.
The Smart Card Alliance, "Mobile Payments at the Physical Point-of-Sale: Assessing U.S. Market Drivers and Industry Direction", Pub. No. PT-05001, Apr. 2005, 52 pages.
Wong, "Canada Office Action received for Canada Patent Application No. 2819830", dated Nov. 21, 2014, 6 pages.
Yook, "Korean Office Action issued in Korean Application No. 10-2013-7017123", dated Oct. 7, 2014, 8 pages of English Translation and 6 pages of Korean Office Action.
Yun, et al., "Design and Implementation of Wireless Payment System Using GVM and MobileC", Proceedings of the International Conference on Mobile Computing and Ubiquitous Networking, vol. 1, 2005, 10 pages.
Zhang, "Chinese Office Action issued in Chinese Application No. 201280048281.7", dated Apr. 6, 2016, 13 pages of English Translation and 10 pages of Chinese Office Action.
Zhou, "Chinese Office Action issued in Chinese Application No. 201180066157.9", dated Dec. 28, 2015, 25 pages of English Translation and 14 pages of Chinese Office Action.
Byrd, "U.S. Office Action issued in copending U.S. Appl. No. 13/410,209, filed Mar. 1, 2012", dated Dec. 28, 2016, 31 pages.
Lopez Perez, "European Office Action issued in European Application No. 13775567.4", dated Dec. 19, 2016, 4 pages.
Park, "Korean Office Action issued in Korean Application No. 10-2014-7009875", dated Dec. 27, 2016, 4 pages of English Translation and 4 pages of Korean Office Action.
Byrd, "U.S. Office Action issued in copending U.S. Appl. No. 13/410,209, filed Mar. 1, 2012", dated Jul. 19, 2017, 31 pages.
Zhou, et al., "Chinese Office Action issued in Chinese Application No. 201280048309.7", dated Feb. 20, 2017, 16 pages of English Translation and 08 pages of Chinese Office Action.
Buchanan, "Google Wallet: How Google's Going to Eat Your Real Wallet", May 26, 2011, 8 pages.
Hardeman, "Extended European Search Report issued in European Application No. 17150362.6", dated Feb. 24, 2017, 10 pages.
Byrd, "U.S. Office Action issued in copending U.S. Appl. No. 13/410,209, filed Mar. 1, 2012", dated Jan. 26, 2017, 31 pages.
Hardeman, "European Office Action issued in European Application No. 12825391.1", dated Mar. 15, 2016, 5 pages.
Mori, "Japanese Office Action issued in Japanese Application No. 2014-530951", dated Aug. 15, 2016, 4 pages of English Translation and 4 pages of Japanese Office Action.
Byrd, "U.S. Office Action issued in copending U.S. Appl. No. 13/410,209, filed Mar. 1, 2012", dated Mar. 23, 2018, 45 pages.
Hardeman, "European Office Action issued in European Application No. 17150362 .6", dated Mar. 27, 2018, 4 pages.
Mori, "Japanese Office Action issued in Japanese Application No. 2016-252931", dated Feb. 5, 2018, 05 pages of English Translation and 04 pages of Japanese Office Action.
Yook, "Korean Office Action issued in Korean Application No. 10-2015-7035030", dated May 14, 2018, 8 pages of English Translation and 7 pages of Korean Office Action.
Fujiwara, "Japanese Office Action issued in Japanese Application No. 2016-252931", dated Sep. 3, 2018, 05 pages of English Translation and 04 pages of Japanese Office Action.
Park, "Korean Office Action issued in Korean Application No. 10-2014-7007212", dated Jul. 30, 2018, 4 pages of English Translation and 4 pages of Korean Office Action.

ONE-CLICK OFFLINE BUYING

CROSS-REFERENCE TO RELATED APPLICATIONS

This application is a continuation of U.S. patent application Ser. No. 13/361,343, filed Jan. 30, 2012, and entitled "One-Click Offline Buying," which claims priority to U.S. Provisional Patent Application No. 61/536,042, entitled "One Click Offline Buying" and filed Sep. 18, 2011. The entire disclosure of each of the above-identified priority applications is hereby fully incorporated herein by reference.

TECHNICAL FIELD

The invention relates generally to systems, methods, and devices for initiating a contactless payment transaction using a mobile device electronic wallet application, and, more particularly, to systems, methods, and devices whereby a user can use a single action to activate a mobile device secure element that is necessary to initiate a contactless payment transaction.

BACKGROUND

Contactless payment technology incorporates proximity communications between two devices to authenticate and enable payment for goods and services over the air (OTA) or without physical connection. Near Field Communication (NFC) is an example of a proximity communication option that can enable contactless payment technologies and that is supported by the Global System for Mobile Communications (GSM) Association. RFID is an example of a proximity communication method that can be adapted to enable NFC contactless payment technology. NFC communication distances generally range from about 3 to about 4 inches. Such short communication distances enable secure communication between close field proximity enabled devices. Proximity enabled contactless payment also can be implemented on Code Division Multiple Access (CDMA) devices with an embedded secure element within an NFC controller or a Re-usable Identification Module (R-UIM) type card.

Existing contactless payment technology is not integrated with NFC mobile device communication elements. As a result, a user must maneuver through multiple activating steps to initiate a payment transaction. For example, the mobile device must not only be turned "on" but must also be "active." A user must unlock their mobile device and launch a contactless payment application, such as an electronic wallet application. Within the application the user must signal an intent to initiate a payment and enter security information such as a personal identification number. The user must also select a payment option, such as a particular credit card, to use in the payment transaction. The majority of these steps must be repeated for each payment transaction.

Accordingly, there is a need in the art for methods and systems that integrate contactless payment technology with the mobile device's contactless communication systems and streamline the process by which a user can securely initiate payment transactions.

SUMMARY

In certain exemplary embodiments, a computer-implemented method for initiating a contactless payment transaction using a single input activation of a mobile device's secure element comprises detecting the activation status of the mobile device's screen. The contactless communication system of the device is inactive while the device's screen is inactive. An exemplary contactless communication system may comprise an NFC controller and NFC antenna. Upon detection of screen activation, the contactless communication system is activated. In certain exemplary embodiments, the secure element may be also activated upon screen activation. In certain other exemplary embodiments, activation of the secure element may further require an active electronic wallet application. Where activation of the electronic wallet application is required, the electronic wallet application can be activated by a single-click input. The single-click input subsequently activates the secure element, identifies the default payment information, and prepares the default payment information for communication to a merchant reader terminal via the mobile device contactless communication system.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
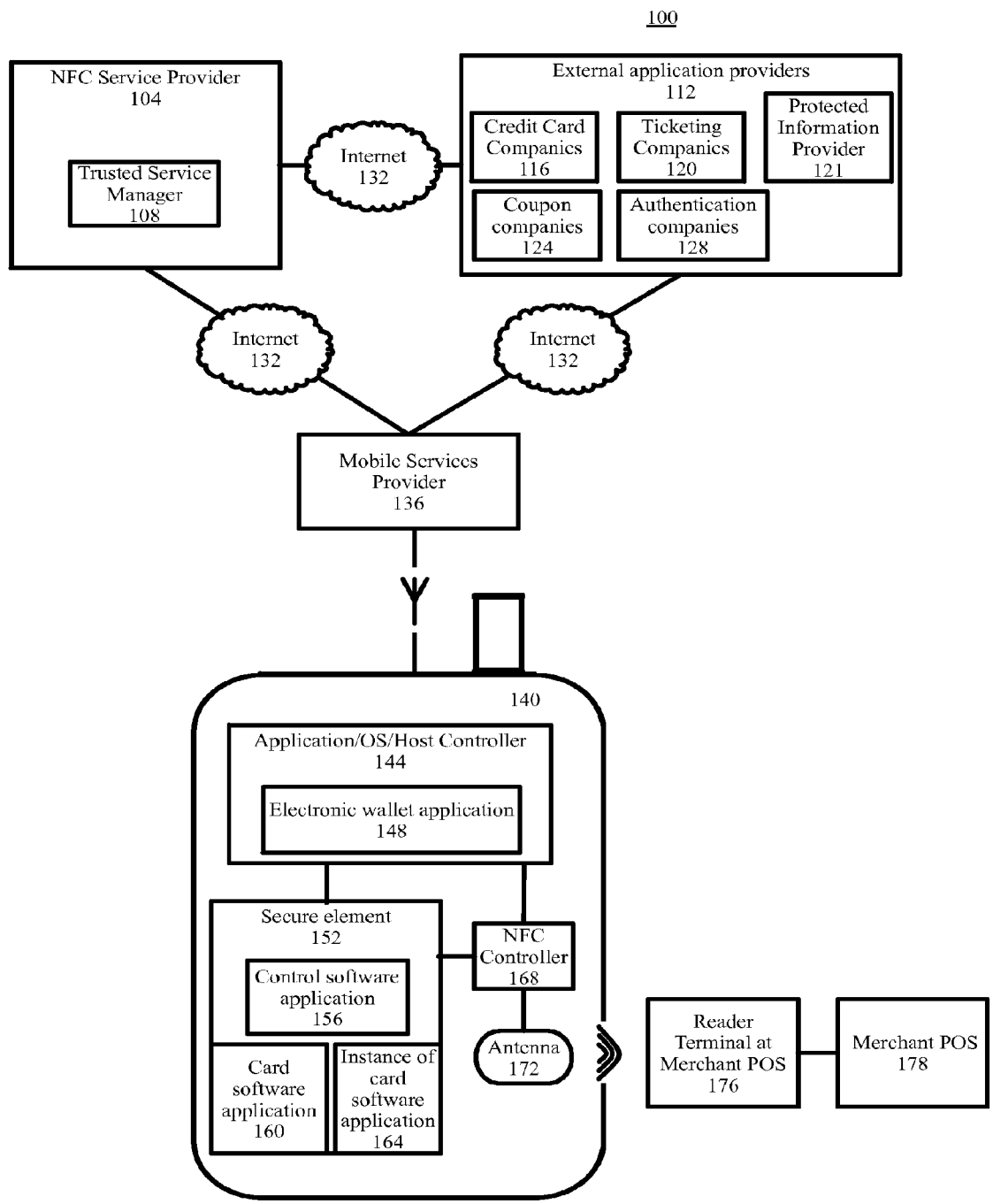
FIG. 1 is a block diagram depicting systems for processing NFC payment transactions through single action activation of a mobile device secure element in an NFC communication system according to certain exemplary embodiments.

The methods, systems and devices described herein enable a user to initiate a contactless payment transaction through a single input activation of an electronic wallet application. The present invention integrates secure element activation of a contactless payment system with the contactless communication systems of a mobile device, such as an NFC controller and antenna, to allow secure and efficient initiation of contactless payment transactions. Default payment information is specified and stored within a secure element of the mobile device. Upon activation of the mobile device screen from a sleep or powered-down state, or in combination with one-click activation of the electronic wallet application, the secure element and contactless communication systems of the device are activated. Following secure element and contactless communication system activation, the device is prepared to communicate payment information stored in the secure element to a reader terminal connected to a merchant point of sale device. In certain exemplary embodiments, the wallet application remains active even after the mobile device goes dormant. In certain other exemplary embodiments, a user may configure how long the electronic wallet application remains active before timing out. By maintaining either the contactless communication system, or secure element, or both as inactive, the present invention maintains security and prevents the initiation of payment transactions or access to payment information without the user's consent. By integrating the activation of the mobile device's contactless communication systems and secure elements, the present invention can provide that when the user is ready to initiate a payment transaction, the user can do so efficiently.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

FIG. 1 is a block diagram depicting a system 100 for enabling single input activation of a mobile device secure element to process NFC payment transactions.

An external trusted service manager (TSM) 108 controlled by a near field communications (NFC) service provider 104 hosts and transmits card software applications for installation within the secure element 152 of a contactless smart card in mobile device 140. The NFC service provider 104 provides a secure key encrypted software card application for decryption and installation in the secure element 152. The TSM 108 includes a trusted service agent, which may be an automated software distribution entity within the TSM. In certain exemplary embodiments, the TSM may be accessible to the mobile device 140 via the Internet 132 directly, without the requirement of a mobile services provider 136 for the purpose of downloading trusted card software applications to the mobile device. The mobile services provider 136 provides card software applications in one of many mobile services protocol, such as 3G and 4G.

In certain exemplary embodiments, the TSM 108 may exist as a part of the mobile services provider 136.

In certain exemplary embodiments, external application providers 112 provide card software applications to the TSM 108 for deployment to the mobile device 140. In an alternative embodiment, each of the external application providers 112 may include a TSM for providing trusted card software applications directly to the mobile device via the Internet 132 or the mobile service provider 136. Exemplary external application providers 112 include credit card companies 116 for providing credit card type payment card software applications, such as Java credit/debit/PayWave/PayPass type applets, ticketing companies 120 for providing tickets to events, travel, and other related functions, coupon companies 124 for providing coupons that are downloaded and scan-able at a point-of-sale (POS) using the contactless smart card, RFID tags, barcodes, QR 2 dimensional bar codes, and other similar optical coding methods, an authentication company 128 for providing authentication data that may be used to lock/unlock physical appliances or for virtual functions on computer software, and a protected information provider 121, such as a bank, merchant, or other financial service provider, for providing confidential or otherwise protected information (for example, account information), which may be used to instantiate a particular card.

In certain exemplary embodiments, an application host OS 144 on the mobile device 140 provides the user of the mobile device with the capability to manage multiple card software application instances 160-164 using a wallet software application 148, where the wallet software application does not need TSM 108 permission to perform certain functions on each of the card software application instances 160-164. The management of the card software applications may be performed via a control software application 156, which communicates with the wallet software application 148 using APDUs, transmitted and received, through a secure and encrypted communication channel. The control software application 156 may freely communicate with the multiple card software application instances 160-164 because each of the card instances 160-164 and the control software application 156 are resident within the same secure element 152. Alternatively, multiple secure elements providing secure communication channels can provide the same functionality as disclosed herein. The user may engage the control software application 156 using commands to activate, deactivate, prioritize, delete, and install card software applications 160-164 within the secure element.

When the default card software application has been activated according to the methods of the present invention, the NFC controller 168 is notified of the state of readiness of the mobile device 140 for an NFC transaction. The NFC controller polls, through the antenna 172, a radio signal, or listens for radio signals from a reader terminal device 176. On establishing a channel between the devices 172 and 176, the reader requests to see the list of available card software applications within the secure element 156. Default payment information is then transmitted from the application 160-164 set as the default payment option to the reader terminal and the transaction is initiated.

System Process

Figure 2:
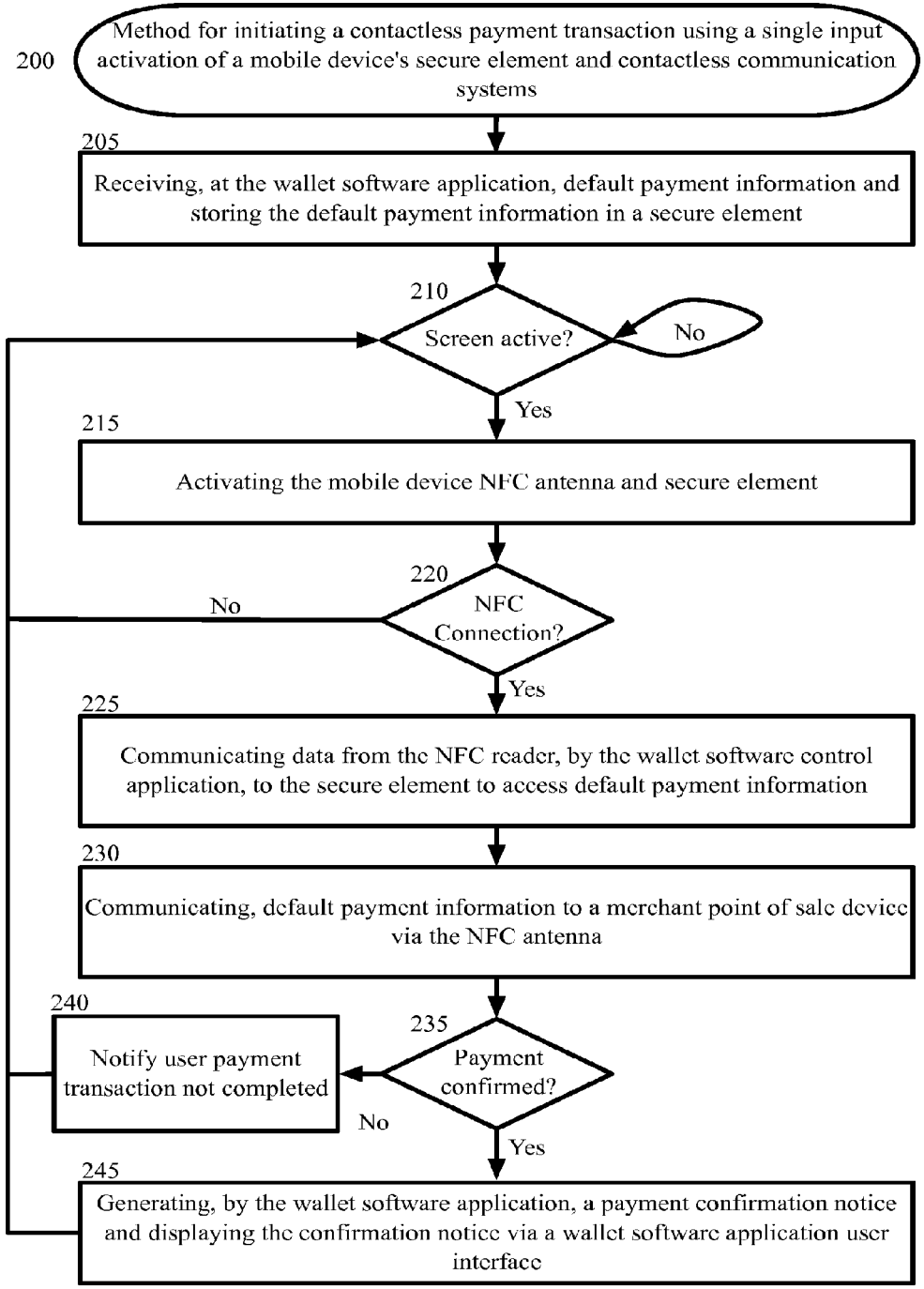
FIG. 2 is a block flow diagram depicting a method for initiating a contactless payment transaction using a single input activation of a secure element in an NFC communication system according to certain exemplary embodiments.

FIG. 2 is a block flow diagram depicting a method 200 for using a single input activation of a mobile device screen to activate a secure element and NFC antenna to process a contactless payment transaction. The method 200 is described with reference to the components illustrated in FIG. 1.

At block 205, the electronic wallet application 148 receives input of default payment information from a user of the mobile device via a user interface generated by the electronic wallet application 148, and communicates the input to the control software application 156 on the secure element 152. The control software application 156 prioritizes the card software applications 160-164 according to the input received from the electronic wallet application 148. Alternatively, default payment information may be communicated to the device via the Internet 132, mobile services provider 136, or other suitable communication network.

In an exemplary embodiment, the wallet application 148 can operate continuously after being activated.

At block 210, the method 200 determines whether the screen of the device 140 is active. In this embodiment, the secure element 152 is inactive if the mobile device screen is inactive. In an inactive state, the secure element 152 can neither receive nor communicate payment information through the mobile device contactless communication system, such as the NFC controller 168 and antenna 172. Upon screen activation, the host controller 144 detects a change in the screen activation status and communicates the change in screen status to the control software application 156 of the secure element 152 and the NFC controller 168. In an exemplary embodiment, the host controller 144 communicates the screen activation status to the wallet application 148, which communicates the screen activation status to the control software application 156 of the secure element 152.

A mobile device screen is "active" or "activated" when powered on and displaying a default home user interface. A screen may become active, for example, by response to direct user input, from the detection of movements that would indicate the user is preparing to use the device, or from the detection of voice commands.

If the screen is active, the method 200 proceeds to block 215.

At block 215, the secure element 152 and the NFC controller 168 receive the communication indicating a change in the mobile device screen's activation status. The NFC controller 168 is configured so that the antenna 172 is inactive when the screen is inactive. Accordingly, the antenna 172 will become active and inactive in sync with subsequent communications to the NFC controller 168 indicating the mobile device screen's activation status.

The secure element 152 can neither receive nor transmit data until activated. In an exemplary embodiment, the wallet application 148 can operate continuously after being activated by the user, even when the screen is not active. In this state, the wallet application 148 remains active in the background, awaiting the screen activation status. After receiving the screen activation status from the host controller 144, the wallet application 148 can activate the secure element 152 for an NFC payment transaction. Accordingly, the secure element 152 will become active and inactive in sync with subsequent communications indicating the mobile device screen's activation status.

At block 220, the NFC controller 168 polls, through the antenna 172, a radio signal, or listens for radio signals from a point of sale reader terminal device 176. If a radio signal is not detected, the method 200 returns to block 210 and continues to monitor. If the screen remains active, there is no change in status communicated to the NFC controller 168 or the secure element 152 at block 215. Once the screen goes inactive, the change in screen status is communicated to the NFC controller 168 and the secure element 152 following the same procedure discussed in block 215, and the antenna 172 and the secure element 152 are deactivated.

Referring back to step 220, while active, if the antenna 172 detects a reader terminal communication field, the method proceeds to block 225.

At block 225, data received from the reader terminal 176 at the antenna 172 is communicated to the control software application 156. The control software application 156 accesses the default payment information stored on the secure element 152 and prepares the payment information for communication to the reader terminal 176. Multiple forms of payment information can be stored in the secure element 152. The control software application 156 will select the payment information identified in block 205 as the default payment information for processing the transaction. The user can change or modify the default payment information at their discretion using the electronic wallet application 148.

At block 230, the control software application 156 communicates the default payment information to the reader terminal 176 via the NFC antenna 172. The default payment information is received at the reader terminal 176 and further processed by the merchant POS device 178.

At block 235 the mobile device 140 waits to receive payment confirmation via the terminal reader 176 from the merchant POS device 178. The payment confirmation may be monitored by the secure element 152. Upon receipt of payment confirmation from the merchant POS 178, the secure element 152 communicates the payment confirmation to the electronic wallet application 148. The electronic wallet application 148 then notifies the user of the payment confirmation via the user interface generated by the wallet application (see block 245).

Alternatively, the payment confirmation may be monitored directly by the electronic wallet application 148. The control software application 156 can notify the electronic wallet application 148 of the communication of payment information to the merchant POS 178, prompting the electronic wallet application 148 to monitor for receipt of the payment confirmation from the merchant POS 178.

If the payment is not confirmed at block 235, the method proceeds to block 240. At block 240, the wallet application 148 generates a notification indicating the payment transaction was not completed and communicates the notice to the user via the user interface generated by the electronic wallet application 148. In certain exemplary embodiments, the electronic wallet application 148 may present to the user the option of selecting an existing account or entering new payment account information to use as the default payment information. The process then returns to block 210 to repeat the method 200 as necessary.

Referring back to block 235, if the payment is confirmed, the method 200 proceeds to block 245. At block 245, the electronic wallet application 148 generates a payment confirmation notice and communicates the notice to the user via the user interface generated by the wallet application 148. A payment notification may include transaction details such as the details included on standard paper receipts. In an exemplary embodiment, the payment notification may be a replication of a receipt or receipt information received from the merchant POS system 178.

The payment notifications may be stored by the wallet software application 148 on the mobile device 140, and/or communicated to a separate device, such as a personal cloud server or other central server or a personal computer of the user. For example, the user may review receipt information via the user interface generated by the wallet application 148, and/or receipt information may be used by another system to identify user preferences.

From block 245, the method 200 returns to block 210 to determine whether the screen is still active. If the screen is inactive, the NFC antenna 172 is deactivated by the NFC controller 168. If the screen is still active, the NFC antenna 172 remains active and ready to detect additional reader terminal 176 radio signals and to initiate subsequent payment transactions.

Figure 3:
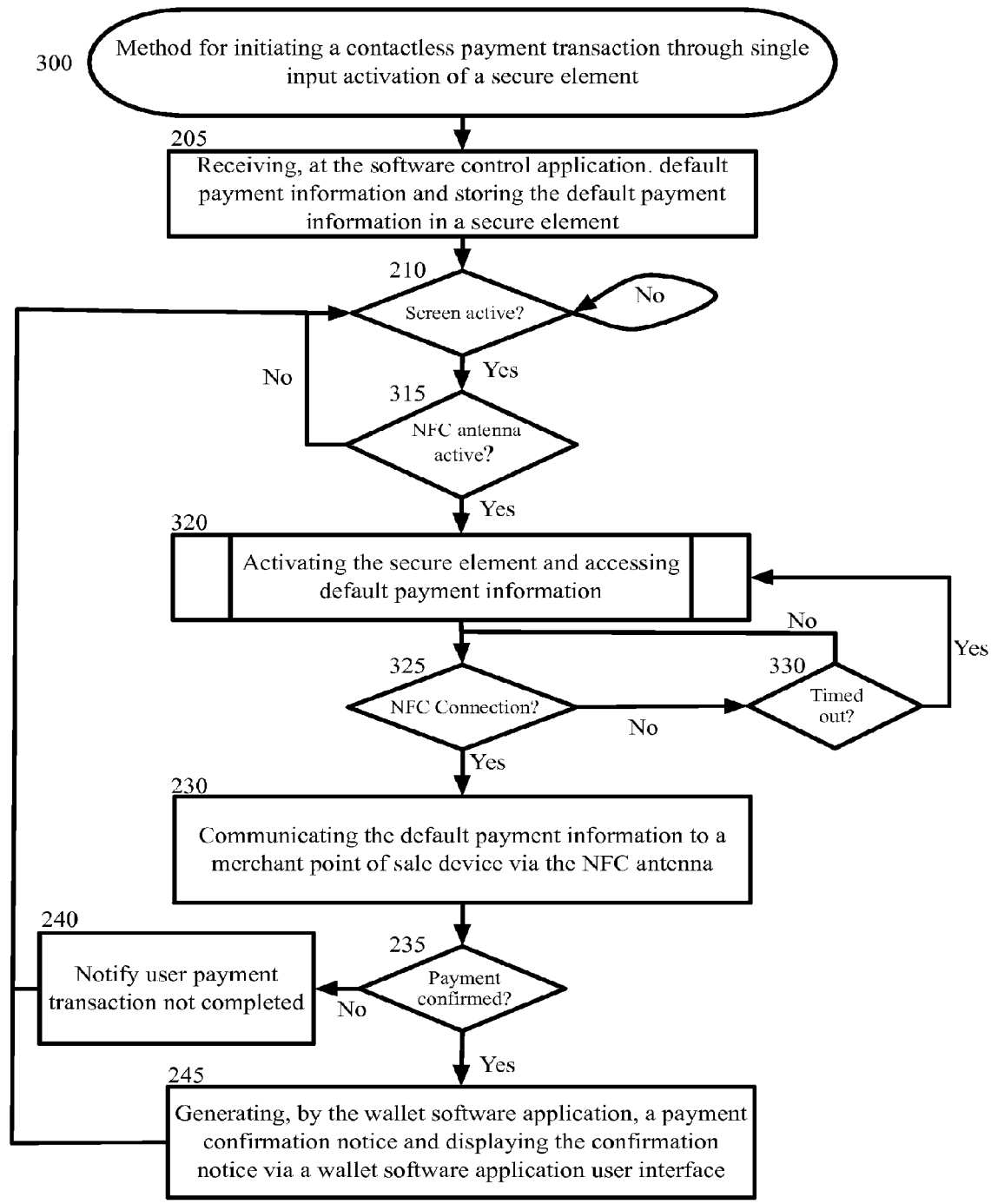
FIG. 3 is a block flow diagram depicting a method for initiating a contactless payment transaction through a single input activation of a secure element independent of NFC communication system activation according to certain exemplary embodiments.

FIG. 3 is a block flow diagram depicting a method 300 for using a one-click input to activate a secure element 152 to process a payment transaction where activation of the secure element is independent of NFC communication system activation. The method 300 is described with reference to the components illustrated in FIG. 1.

In certain exemplary embodiments, the NFC antenna 172 is activated prior to activation of the secure element 152.

The first two blocks of method 300 proceed as described previously with reference to blocks 205 and 210 of FIG. 2.

At block 315, the NFC controller 168 receives the communication indicating a change in the screen activation status and changes the activation status of the antenna 172 accordingly. The NFC controller 168 is configured so that the antenna 172 is inactive when the screen is inactive. Accordingly, the antenna 172 will become active and inactive in sync with subsequent communications to the NFC controller 168 indicating the mobile device screen's activation status.

At block 320, the secure element 152 is activated and the default payment information is configured for a contactless payment transaction via a single click command. Block 320 will be described in further detail hereinafter with reference to FIG. 4.

Figure 4:
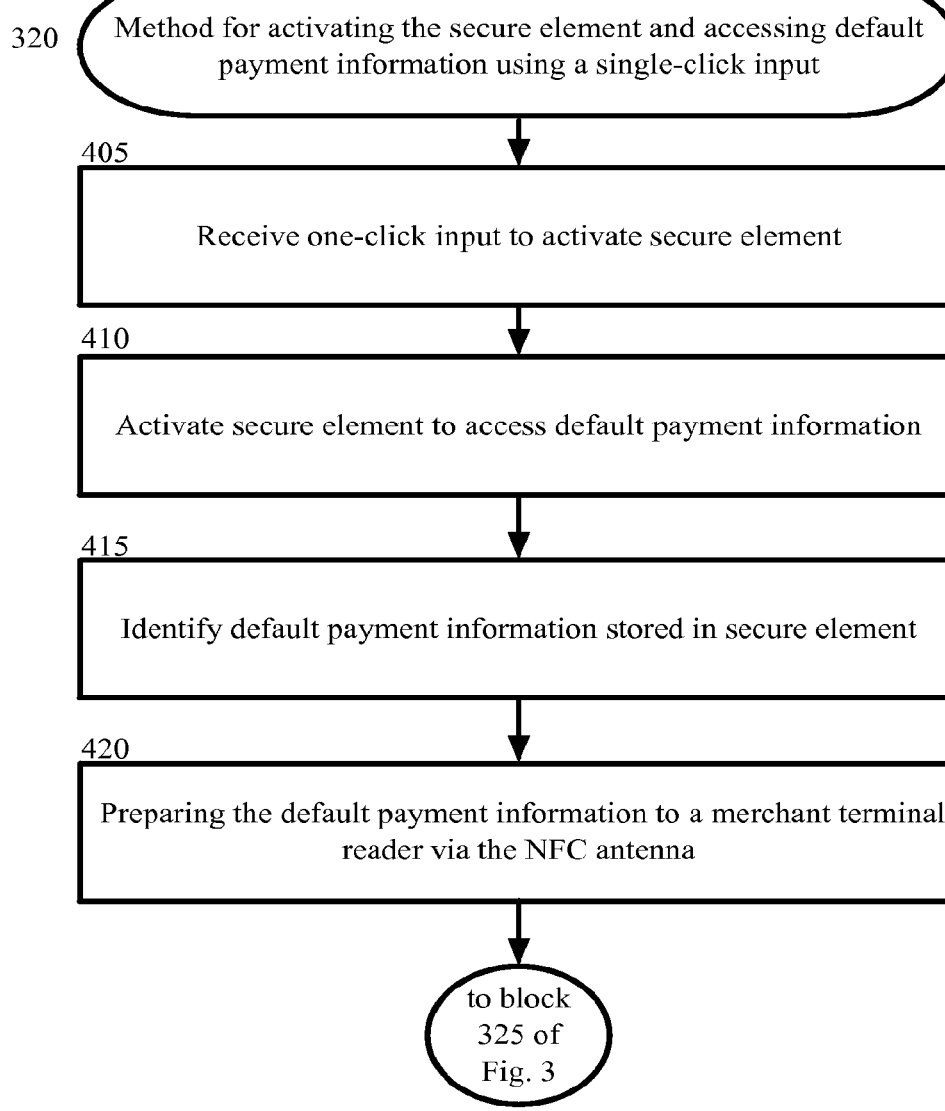
FIG. 4 is a block flow diagram depicting a method for activating a secure element in communication with an electronic wallet application using a single-click input according to certain exemplary embodiments.

FIG. 4 is a block flow diagram depicting the method 320 for activating, using a one-click input, the secure element 152 to access the default payment information for a contactless payment transaction. Thus, FIG. 4 describes the process 320 by which a one-click input is utilized to activate the secure element 152 to allow processing of an NFC payment transaction according to an exemplary embodiment.

At block 405, the electronic wallet application 148 receives a one-click input and communicates the input to the secure element 152. In certain exemplary embodiments, the one-click input comprises a physical tap, a voice command, selection by the user of a defined control on the user interface generated by the electronic wallet application 148, activation of a defined button on the contactless device 140, activated of a motion gesture that is detected by a gyroscope or other motion-detecting mechanism of the contactless device 140 (for example, a shake, double shake, "fishing," or other motion of the contactless device 140). The wallet application 148 detects the user input of the command to ready the secure element 152 for a contactless payment transaction and communicates the command to the secure element 152.

At block 410, the control software application 156 of the secure element 152 receives the one-click input communication from the electronic wallet application 148 and activates the secure element 152 to make the default payment information accessible. In this case, activation means that the secure element 152 is able to communicate with a reader terminal for a contactless payment transaction.

At block 415, the control software application 156 identifies the default payment information stored in the secure element 152. Multiple forms of payment information can be stored in the secure element 152. The control software application 156 will select the payment information identified in block 205 of FIG. 3 as the default payment information for processing the transaction. The user can change or modify the default payment information at their discretion using the electronic wallet application 148.

At block 420, the control software application 156 prepares the default payment information for communication to the NFC antenna 172. Preparation of the default payment information can comprise the identification of the default payment information that can be communicated in the payment transaction. Alternatively or additionally, preparation of the default payment information can include encrypting the payment information for secure transmission to a reader terminal. The control software communication module 156 will not communicate the payment information to the NFC antenna 172 until the NFC controller 168 indicates the NFC antenna 172 has detected a reader terminal 176 radio signal.

The method 320 then proceeds to block 325 of FIG. 3.

Returning to FIG. 3, at block 325, the NFC controller 168 polls, through the antenna 172, a radio signal, or listens for radio signals from a reader terminal device 176. If no radio signal is detected, the method 300 proceeds to block 330 to determine if an time-out period for activation of the secure element has expired. In certain exemplary embodiments, the time-out period could be based on a time-out period for the wallet application 148. In certain exemplary embodiments, when the electronic wallet application times-out period expires, a personal identification number, password, or other authentication must be entered to unlock the application. The electronic wallet application time-out period can be configured through settings of the electronic wallet application 148. If the time-out period has not expired, the NFC controller 168 will maintain the NFC antenna 172 in an active state. If no reader terminal 176 radio signal is detected within the time-out period, the method 300 returns to block 320 and reactivation of the secure element 152 is required.

Referring back to block 325, if a radio signal is detected at block 325, the subsequent steps of communicating the default payment information to a merchant point of sale device via the NFC antenna 172, confirming payment, notifying user payment transaction is complete or not complete, and generating a payment confirmation and displaying the confirmation via the wallet software application 148 interface, proceeds as described previously with reference to blocks 230-245 of FIG. 2, respectively.

The wallet application 146 in conjunction with the secure element 152 can accommodate multiple payment methods. Within the secure element 152, multiple credit cards, debit cards, and/or other forms of secure payment can be stored. The user can select a particular one of the payment forms as the default payment method. Additionally, the wallet application 148 can store and process unsecure payment forms, such as coupons, loyalty cards, check-ins, membership cards, gift cards, and other forms of value-added services. The wallet application 148 can communicate these payment forms to the reader terminal 176 via the antenna 172 for application during the payment transaction.

In exemplary embodiments, a payment transaction can comprise one or more payment or other value transactions, all conducted within a single tap of the contactless payment device 140 with the reader terminal 176.

Exemplary value added services can be embodied in one or more value added applications residing on the device 140 and/or within the secure element 126. Value added applications can perform functionality to redeem the value added services.

For example, a value added coupon application can automatically redeem coupons stored in the value added coupon application. More specifically, a user may save one or more coupons (or other "offers") to the value added service coupon application on the contactless device 140. When the default payment information communication is performed in block 230, the value added coupon can be applied to the transaction. For example, the value added coupon application can search stored coupons that can be applied to the current transaction. This determination can be based on an identity of the merchant operating the POS system 178 and products being purchased, as provided by the device reader 176 to the device 140. Alternatively, or additionally, merchant information can be determined by the value added coupon application based on geocode information available to the device 140 by comparing the geocode information for the current location of the device 140 with known merchant locations. After identifying coupons that can apply to the merchant or products, the value added coupon application communicates the coupon(s) to the device reader 176 via the antenna 172. Thereafter, the POS system 178 processes the coupon for the transaction. If multiple coupons apply to the transaction, the value added service application can determine which coupon offers the greatest value and/or which combination of coupons offers the greatest value and can automatically apply the greatest value choice.

As another example, a value added loyalty application can automatically collect and redeem loyalty rewards. More specifically, a user may install a loyalty application for a particular merchant (or a loyalty application that operates for multiple merchants). Each time a transaction is conducted with the merchant, the value added loyalty application collects loyalty rewards (for example, points, number of visits, number of items purchased, or other suitable reward). Then, when sufficient loyalty rewards have been collected to redeem for value, the value added loyalty application can automatically apply the redemption. For example, when default payment information communication is performed in block 230, the value added loyalty rewards can be accumulated and/or applied to the transaction. For example, the value added loyalty application can search accumulated rewards that can be applied to the current transaction. This determination can be based on an identity of the merchant and products being purchased, as provided by the device reader 176 to the device 140. Alternatively, or additionally, merchant information can be determined by the value added loyalty application based on geocode information available to the contactless device 140 by comparing the geocode information for the current location of the device 140 with known merchant locations. After identifying loyalty rewards that can be redeemed for the merchant or products, the value added loyalty application communicates the loyalty reward (s) to the device reader 176 via the antenna 172. Thereafter, the POS system 178 processes the loyalty rewards for the transaction. If loyalty rewards are not available for redemption, the value added loyalty application communicates a request to accumulate loyalty rewards to the device reader 176 via the antenna 172. Thereafter, the POS system 178 processes the transaction and communicates the loyalty rewards for the transaction from the device reader 176 to the contactless device 140. The value added loyalty application increments the stored loyalty rewards accordingly for future redemption.

Other value added applications can be implemented in a similar manner, for example, check-ins, membership cards, gift cards, and other forms of value-added services. Corresponding value added service applications can function to determine whether the particular service applies to the transaction (for example, to the merchant or the product) and to apply the service to the transaction if appropriate. For instance, a gift card having value stored thereon can be applied to the transaction.

In this manner, multiple value added services can be applied in blocks 230 and 235. The wallet application 148 can process each available value added service application to thereby apply all available value added services to the transaction. Additionally, if multiple value added services apply to the transaction, the application 148 can determine which service offers the greatest value and/or which combination of services offers the greatest value and can automatically apply the greatest value choice. Furthermore, after application of all value added services, the POS system 178 charges the remaining balance to the default payment method through a secure payment transaction with the secure element 152. All of the transactions can be processed via a single tap of the device 140 to the reader terminal 176.

The payment confirmation generated in block 245 can identify all items applied to the transaction. For example, the payment confirmation can identify each coupon, loyalty redemption, stored value card, other value added service, and all secure payment forms applied to the transaction, and may also show items included in the transaction (for example, ticket numbers for tickets purchased). In an exemplary embodiment, a single payment confirmation may show all items applied to the transaction. Alternatively, multiple payment confirmations may be provided, wherein each receipt is for a particular one of the items applied to the transaction.

General

The exemplary systems, methods, and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described herein. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for initiating a mobile computing device contactless payment transaction, comprising:
   detecting, by the mobile device, a one click input, a movement indicating the user is preparing to use the device, detection of voice commands, or a combination thereof;
   activating, by the mobile device, a contactless communication system of the mobile device and a secure element of the mobile device in response to detecting the one-click input, the movement indicating the user is preparing to use the device, detection of voice commands, or a combination thereof;
   detecting, by the mobile device, a contactless communication reader terminal signal;
   establishing, by the mobile device, a contactless communication session with the reader terminal in response to detecting the contactless communication reader terminal signal;
   receiving, by the mobile device, information to conduct the payment transaction from the reader terminal; and
   communicating, by the contactless communication system of the mobile device, default payment information stored in the secure element of the mobile device to the reader terminal in response to receiving the information to conduct the payment transaction.

2. The method of claim 1, wherein the contactless communication system of the mobile device comprises a near field communication (NFC) controller and antenna.

3. The method of claim 1, wherein the screen activation status of the mobile device is active when powered on and displaying a default home user interface.

4. The method of claim 1, wherein detecting the reader terminal signal comprises one of actively or passively detecting the reader terminal radio signal.

5. The method of claim 1, wherein communicating the default payment information is controlled by a control software application module of the secure element.

6. The method of claim 1, further comprising:
   activating, by the mobile device, the secure element, wherein activation of the secure element provides access to payment information stored in the secure element;
   identifying, by the mobile device, the default payment information stored in the secure element; and
   preparing, by the mobile device, the default payment information for communication to the reader terminal.

7. A computer-implemented method for initiating a mobile device contactless payment transaction, comprising:
   detecting, by the mobile device, a screen activation status of the mobile device wherein the screen is active if displaying a default home user interface;
   detecting, by the mobile device, a contactless communication system activation status of the mobile device;
   activating, by the mobile device, a secure element of the mobile device in response to detecting that the mobile device screen and the contactless communication system is active, wherein default payment information is stored in the secure element;
   detecting, by the contactless communication system of the mobile device, a signal from a reader terminal; and
   communicating, by contactless communication system of the mobile device, the default payment information stored in the secure element of the mobile device to the reader terminal in response to detecting the reader terminal signal.

8. The method of claim 7, wherein activating the secure element comprises:
   receiving, by the mobile device, a one-click input;
   activating, by the mobile device, the secure element, wherein activation of the secure element provides access to payment information stored in the secure element;
   identifying, by the mobile device, the default payment information stored in the secure element; and
   preparing, by the mobile device, the default payment information for communication to the reader terminal.

9. The method of claim 8, wherein the one-click input comprises a physical tap, a voice command, selection of a user interface control, selection of a control of the mobile device, or a movement gesture of the mobile device.

10. The method of claim 8, wherein identifying and preparing the default payment information is controlled by a control software application module of the secure element.

11. The method of claim 7, wherein the contactless communication system comprises a near field communication (NFC) controller and antenna.

12. The method of claim 7, wherein the screen activation status of the mobile device is active when powered on and displaying a default home user interface.

13. The method of claim 7, wherein detecting a screen activation status comprises detecting at least one of a direct user input, a movement indicating a user is preparing to use the device, and a voice command.

14. The method of claim 7, wherein detecting the reader terminal radio signal comprises one of actively or passively detecting the reader terminal radio signal.

15. A computer program product, comprising:
   a non-transitory computer readable medium having computer-executable program instructions embodied therein to activate a secure element of mobile devices, the computer-executable program instructions comprising:
   computer-executable program instructions to detect an activation status of a mobile device by detecting a one-click input, a movement indicating the user is preparing to use the mobile device, detection of voice commands, or a combination thereof;
   computer-executable program instructions to communicate the activation status to the secure element, wherein receipt of the communication by a control software application of the secure element activates the secure element;
   computer-executable program instructions to identify the default payment information stored in the secure element; and
   computer-executable program instructions to prepare the default payment information for communication by the mobile device to a terminal reader.

16. The computer program product of claim 15, further comprising computer-executable program instructions to communicate the default payment information from the secure element to a contactless communication system of the mobile device.

17. The computer program product of claim 16, wherein the contactless communication system of the mobile device comprises a near field communication (NFC) controller and antenna.

18. The computer program product of claim 15, wherein the one-click input is a physical tap, a voice command, selection of a user interface control, selection of a control of the mobile device, or a movement gesture of the mobile device.

19. The computer program product of claim 15, wherein the secure element comprises the control software application and at least one card software application, wherein the default payment information is stored in the at least one card software application, and wherein the control software application identifies the default payment information in the at least one card software application.

20. A mobile device, comprising:
a storage device,
a secure element, and
a contactless communication system; and
a processor communicatively coupled to the electronic wallet application, the secure element, and the mobile device controller, wherein the processor executes application code instructions that are stored in the storage device and that cause the mobile device to:
  detect a screen activation status of the mobile device screen, wherein the screen activation status is active if displaying a default home user interface;
  activate the contactless communication system when the screen activation status is active;
  activate the secure element when the screen activation status is active;
  detect a contactless communication signal of a reader terminal;
  access default payment information stored in the secure element; and
  communicate, via the contactless communication system, the default payment information to the reader terminal.

21. The system of claim 20, wherein activating the secure element further comprises receiving a one-click electronic wallet application input.

22. The system of claim 20, wherein the contactless communication system comprises a near field communication (NFC) controller and antenna.

23. The system of claim 20, wherein detecting the reader terminal signal comprises actively or passively detecting the reader terminal radio signal.

\* \* \* \* \*